UNITED STATES PATENT OFFICE.

JOHN DAVID WOMACK, OF CAMERON, TEXAS.

VERMIN POISON.

SPECIFICATION forming part of Letters Patent No. 328,445, dated October 13, 1885.

Application filed May 16, 1885. Serial No. 165,745. (No specimens.)

*To all whom it may concern:*

Be it known that I, JOHN D. WOMACK, a citizen of the United States, residing at Cameron, in the county of Milam and State of Texas, have invented certain new and useful improvements in insecticide compositions for exterminating prairie-dogs, ants, &c.; and I do hereby declare the following to be a full, clear, and exact description of the invention, such as will enable others skilled in the art to which it appertains to make and use the same.

To produce one gallon of the compound, mix bisulphide of carbon, one gallon; brimstone, one and one-half pound; cyanide of potash, (pulverized,) one-fourth pound; carbolic acid, one-half pound; phosphorus, one-eighth pound. Dissolve the brimstone in the bisulphide of carbon, and when thoroughly dissolved add the cyanide of potash and carbolic acid; color the mixture with Prussian blue ground in oil; then add phosphorus.

The mixture should be kept corked to prevent evaporation. It is ready for use immediately.

Mode of use: To destroy prairie-dogs, saturate a piece of cotton or paper with the mixture and place in principal hole in the town; ignite the cotton or paper; then cover up this hole and all the other holes in the town, so as to confine the flames and poisonous fumes in the ground.

To exterminate the ant known as the "hill ant," place a funnel in the hole of the bed; pour in about three ounces of the fluid; let it remain about one minute, and then ignite with a match. Let it burn about two minutes, and then cover up with dirt, so as to confine the flames and fumes.

To exterminate gophers and salamanders, saturate a piece of cotton or paper with the mixture and place in the hole. Then ignite with a match, and after burning about one minute, cover up with dirt to prevent the escape of the flames and fumes. The destruction in each case is caused by the flames and fumes.

The mixture, when exposed to the air, will evaporate rapidly. It is therefore necessary to be careful to keep it well corked, and the fumes will ignite when brought in contact with a flame. So in using be careful to keep away from a fire.

Having thus described my invention, what I claim, and desire to secure by Letters Patent, is—

The insecticide mixture herein described, consisting of bisulphide of carbon, brimstone, powdered cyanide of potassium, carbolic acid, and phosphorus in the proportions described.

JOHN DAVID WOMACK.

Witnesses:
T. T. HENDERSON,
R. I. McCALLA.